US012728679B2

(12) United States Patent
Gowripurohith et al.

(10) Patent No.: US 12,728,679 B2
(45) Date of Patent: Sep. 8, 2026

(54) METHOD FOR CONFIGURING A TRAILER DETECTION SYSTEM

(71) Applicant: Valeo Schalter und Sensoren GmbH, Bietigheim-Bissingen (DE)

(72) Inventors: Vijayakumar Lakshminarasimha Gowripurohith, Bietigheim-Bissingen (DE); Michael Hallek, Bietigheim-Bissingen (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 660 days.

(21) Appl. No.: 17/775,711

(22) PCT Filed: Nov. 10, 2020

(86) PCT No.: PCT/EP2020/081552

§ 371 (c)(1),
(2) Date: May 10, 2022

(87) PCT Pub. No.: WO2021/094270

PCT Pub. Date: May 20, 2021

(65) Prior Publication Data

US 2022/0402320 A1 Dec. 22, 2022

(30) Foreign Application Priority Data

Nov. 14, 2019 (DE) ..................... 10 2019 130 689.2

(51) Int. Cl.
*B60D 1/62* (2006.01)

(52) U.S. Cl.
CPC ...................................... *B60D 1/62* (2013.01)

(58) Field of Classification Search
CPC .... B62D 5/0463; B62D 15/025; B60W 30/12
See application file for complete search history.

(56) References Cited

U.S. PATENT DOCUMENTS

2017/0057413 A1* 3/2017 Shehan ................. G01S 15/931
2020/0023696 A1* 1/2020 Ling ......................... B60R 1/26
2020/0055357 A1* 2/2020 Laine ....................... B60D 1/58

FOREIGN PATENT DOCUMENTS

CN 104339999 A 2/2015
DE 102017106565 A1 10/2017

(Continued)

OTHER PUBLICATIONS

International Search Report and Written Opinion in corresponding International Application No. PCT/EP2020/081552, mailed Feb. 12, 2021 (9 pages).

(Continued)

*Primary Examiner* — Jerrod Irvin Davis
(74) *Attorney, Agent, or Firm* — Osha Bergman Watanabe & Burton LLP

(57) ABSTRACT

The present invention refers to a method for configuring a trailer detection system (10), wherein a trailer (12) is connected to a vehicle (14) via a hitch (16), and wherein the trailer (12) comprises the trailer detection system (10) and a computing system (18), comprising the following steps:

Determining, by a vehicle-integrated computing unit (20), that the trailer (12) is connected to the vehicle (14) via the hitch (16) for data transmission;

Transmitting information about the hitch (16) from the computing unit (20) of the vehicle (14) to the computing system (18) of the trailer (12);

Determining configuration data of the trailer detection system (10) by the computing system (18) of the trailer (12), based on the information about the hitch (16);

Configuring the trailer detection system (10) on the basis of the determined configuration data, by the computing system (18) of the trailer (12).

The present invention also refers to a trailer detection system comprising means for executing the steps of the method.

(Continued)

Furthermore, the present invention refers to a vehicle comprising the trailer detection system. Furthermore, the present invention refers to a computer program comprising instructions which, when the program is executed by a computer, cause the computer to execute the steps of the method. Furthermore, the present invention refers to a data carrier signal, which the computer program transmits. Furthermore, the present invention refers to a computer-readable medium comprising instructions which, when executed by a computer, cause the computer to execute the steps of the method.

15 Claims, 2 Drawing Sheets

(56) References Cited

FOREIGN PATENT DOCUMENTS

| | | | |
|---|---|---|---|
| DE | 102016115391 | A1 | 2/2018 |
| DE | 102016120162 | A1 | 4/2018 |
| DE | 202019104576 | U1 | 9/2019 |
| EP | 2018981 | A1 | 1/2009 |
| EP | 2679463 | A1 | 1/2014 |
| WO | 2019/119308 | A1 | 6/2019 |

OTHER PUBLICATIONS

German Search Report issued in corresponding German Application No. 10 2019 130 689.2, dated Jun. 22, 2020 (5 pages).

Office Action issued in counterpart Chinese Patent Application No. 202080086815.X mailed Apr. 16, 2025 (15 pages).

* cited by examiner

METHOD FOR CONFIGURING A TRAILER DETECTION SYSTEM

The present invention refers to a method for configuring a trailer detection system, wherein a trailer is connected to a vehicle via a hitch, and wherein the trailer comprises the trailer detection system and a computing system.

The present invention also refers to a trailer detection system with means for configuring the trailer detection system for executing the steps of the method.

Furthermore, the present invention refers to a trailer comprising the trailer detection system.

Furthermore, the present invention refers to a computer program comprising instructions which, when the program is executed by a computer, cause the computer to execute the steps of the method.

Furthermore, the present invention refers to a data carrier signal, which the computer program transmits.

Furthermore, the present invention refers to a computer-readable medium comprising instructions which, when executed by a computer, cause the computer to execute the steps of the method.

Basically known are ultrasonic sensor devices for motor vehicles. Such ultrasonic sensor devices are used, for example, in connection with parking support systems for motor vehicles. Such an ultrasonic sensor device usually comprises several ultrasonic sensors with which ultrasonic signals can be emitted. In addition, ultrasonic sensors can be used to receive ultrasonic signals reflected from objects or obstacles. In this way, the objects or obstacles in the vicinity of the vehicle can be detected. In addition, a distance between the vehicle and the object can be determined on the basis of the transit time between the emission of the ultrasonic signal and the reception of the ultrasonic signal reflected by the object.

The sensor signals are configured on the basis of a configuration parameter. This configuration parameter can describe a threshold value or a threshold value curve with which the sensor signals are compared. Only those parts of the sensor signal which are above the threshold value or the threshold curve are taken into account when configuring the sensor signals. In the case of ultrasonic sensor devices which are integrated into the vehicle during production, the configuration parameters are determined precisely for each vehicle model.

In order to ensure reliable detection, sensor units, such as ultrasonic sensors, must always be configured so that they can precisely detect their distance to an underground and their angle to the horizontal axis of the underground while taking into account their distance to it.

A state-of-the-art document dealing with the configuration of sensor units is the German disclosure document DE 10 2016 115 391 A1. This state-of-the-art document describes a configuration of sensor units on a vehicle using a mobile device, such as a mobile phone or smartphone. The aforementioned method is used to set up an ultrasonic sensor device for a vehicle. Here, a configuration parameter stored on a control unit of the ultrasonic sensor device is adapted, whereby a sensor signal of at least one ultrasonic sensor of the ultrasonic sensor device is configured as a function of the configuration parameter. To adjust the configuration parameter, an adjustment signal is received wirelessly from a mobile terminal device external to the ultrasonic sensor device. This procedure is only intended for sensor units directly on vehicles, so that it is not very flexible.

In general, there is a constant need to equip trailers with sensor units and thus extend the detection system of a vehicle. However, each time a vehicle is connected to a trailer equipped with a trailer detection system, the trailer detection system must be configured so that the detection can be precise and reliable. Otherwise there is a risk of accidents due to false detection.

It is an object of the present invention to provide a method for configuring a trailer detection system, a trailer detection system, a trailer, a computer program, a data carrier signal and a computer-readable medium, that enable a trailer with a trailer detection system, unknown to the vehicle, to be connected to a vehicle in such a way that the trailer detection system reliably detects its trailer environment.

This object is achieved by the independent claims. Advantageous embodiments are given in the dependent claims.

In particular, the present invention provides a method for configuring a trailer detection system, wherein a trailer is connected to a vehicle via a hitch, and wherein the trailer comprises the trailer detection system and a computing system, comprising the following steps:

Determining, by a vehicle-integrated computing unit, that the trailer is connected to the vehicle via the hitch for data transmission;

Transmitting information about the hitch from the computing unit of the vehicle to the computing system of the trailer;

Determining configuration data of the trailer detection system by the computing system of the trailer, based on the information about the hitch; and Configuring the trailer detection system on the basis of the determined configuration data, by the computing system of the trailer.

It is preferable that the order of the aforementioned method steps can be varied, unless technically necessary in the aforementioned order. However, the aforementioned order of the method steps is particularly preferred.

In the following, the basic idea of the invention and individual elements of the claimed invention subject matter are explained in accordance with their naming in the claim set and further in the following, particularly preferred embodiments of the invention subject matter are described. Any explanations are descriptive and preferred, but not limiting examples.

The basic idea of the invention is therefore that for a trailer there is a real-time configuration, preferably each time the trailer is connected to a vehicle, so that sensor units of the trailer detection system can reliably detect. Both, the calculation and the selection of the configuration data are based on information provided by the vehicle. This information includes in particular the height of the hitch above the underground. Advantageously, the parking function is available when the trailer is connected. In particular, it is a plug-and-play system, so no modification is required in or on the vehicle. It is also a cost-effective solution. There is the possibility of connecting a new trailer to the vehicle with different numbers of sensor units and positions. The configuration data may also be updated subsequently, for example if the trailer is loaded and thus changes its inclination.

In principle, it is intended that a trailer is connected to a vehicle via a trailer hitch. Trailers are objects that usually have a loading area for transporting goods but do not have their own drive. A trailer hitch, also known as trailer coupling, is a device used to connect a vehicle to a trailer, wherein the hitch is a component of the vehicle. Depending on the type of towing vehicle and trailer, four exemplary and non-limiting types can be found, namely drawbar couplings, common in agriculture and forestry; ball end couplings, common in motor vehicles; jaw couplings in trucks and tractors; and fifth wheels in semitrailers. Less common are types in which coupling hooks with corresponding eyelets are used. The regulations to be applied uniformly in the European Union, for example, are summarized in EC Directive 94/20. As a complete trailer hitch, this includes, for example, a trailer socket. Its primary purpose is to ensure the operation of the lighting equipment in accordance with the regulations in order to establish an interface between the trailer detection system or the computing system of the trailer and the vehicle in the sense of the invention. As an option, this interface can also be provided by wireless transmission, for example. In passenger cars, the connectors carry 12 volts nominal voltage. The 13-pin plug connection according to ISO 11446 has been mandatory since the late 1980s, and the 7-pin plug connection according to ISO 1724, and possibly also according to ISO 3732, can also be used for end-of-life vehicles. There are adapters for connecting the two mechanically incompatible systems. In addition, there are the rarer Multicon connectors according to the Dutch NEN 6120, which is compatible with ISO 1724 and additionally includes the contacts 8 to 13 of the 13-pin connector according to ISO 11446 in a ring shape. The 13-pin plug connection according to ISO 11446 permits one-hand operation and is operated by means of a bayonet lock. By turning the plug clockwise, a quarter of a turn, it is unplugged clockwise and counterclockwise without external pulling or pressurizing, the design permits one-hand operation. The selected bayonet operation is also due to the spring elements, which enclose each contact sleeve and cause the direct actuating forces to increase too much by pulling or pushing. In return, defined contact pressures and thus contact resistances on the one hand and any oxide layers on the plug contact pairs on the other hand are scraped off when actuated. The socket cover with closing spring serves as a protection against loosening. The cover presses on the molded-on circular blank of the plug and thus also prevents unintentional loosening by twisting. The housing is made of glass fiber reinforced plastic.

The 7-pole plug connection according to ISO 1724 or ISO 3732 as well as the 7+6-pole plugs according to Multicon are disconnected and plugged in by pulling and pushing. Depending on the contact pressure, large tensile and compressive forces must be applied. If the other hand is not used to hold against the other, the carrier plates of the trailer sockets are often bent in practice. The socket cover serves as a protection against loosening, the shaped tines of which grip behind the plug. The contacts consist of orthogonally slotted contact pins and rigid sleeves. The contact pressure is achieved by the slotted contact pins. Wear and tear and faulty operation, however, reduce this further and further. Decreasing contact pressure and surface corrosion can lead to inadmissibly high contact resistances. When loaded with high currents, the connection can become excessively hot, causing the contacts to burn and become permanently unusable. The housing is made of glass-fiber reinforced plastic, die-cast metal or sheet steel.

In the version of any standards, if unclear, the oldest filing date of the application documents should be used.

Computing systems or computing units are usually electronic modules, which are predominantly installed there where something has to be controlled or regulated. Computing systems are used in the automotive sector in all conceivable electronic areas, as well as for the control of machines, production lines and other technical processes. They are embedded systems. In current vehicles, computing systems are interconnected via various system buses (CAN, LIN, MOST, FlexRay, Ethernet). The devices use them to exchange system-wide information on operating states and other relevant data in the vehicle. In addition, on-board diagnostics or a vehicle diagnostics system is connected via such buses (and possibly the K-line). This allows communication with the computing systems from the outside using so-called diagnostic devices (alternatively with normal personal computers plus a suitable interface). The main question here is whether the control unit has detected and registered any errors in itself or in the sensors connected to it during the continuous self-tests. OSEK-OS, for example, has established itself in Germany as a real-time operating system and communication standard due to the increasing complexity and demands placed on software and the need for communication between computing systems. Another measure is the increasing standardization of computing system architectures. In the meantime, many computing systems are distributed over the entire vehicle in a normal vehicle. Some modern luxury sedans have more than 100 ECUs installed. The range of microcontrollers used as computing systems extends from 8-bit to 32-bit computers. Microcontrollers are semiconductor chips that contain a processor and peripheral functions at the same time. In many cases, the RAM and program memory are also partially or completely on the same chip. A microcontroller is a single-chip computing system. The term System-on-a-Chip or SoC is also used for some microcontrollers. Modern microcontrollers often include complex peripheral functions such as CAN (Controller Area Network), LIN (Local Interconnect Network), USB (Universal Serial Bus), I^2C (Inter-Integrated Circuit), SPI (Serial Peripheral Interface), serial or Ethernet interfaces, PWM outputs, LCD controllers and drivers, and analog-to-digital converters. Some microcontrollers also have programmable digital and/or analog or hybrid function blocks.

The terms computing system and computing unit differ terminologically in order to assign the computing system to the trailer and the computing unit to the vehicle. In principle, this does not mean that the computing system is more powerful or more complex than the computing unit and vice versa.

The determining by a vehicle-integrated computer unit that the trailer is connected to the vehicle via the hitch for data transmission is equivalent to trailer recognition. Up to now, manufacturers of towing vehicles have only carried out trailer recognition for reasons of comfort; the signal can, for example, adapt the shift points of automatic transmissions and chassis. Therefore, preference is given to vehicles that have technologies that detect a trailer with the help of the plugged-in connector. On the one hand, it is known that there is a switch in a socket which switches off the line of the rear fog lamp in the towing vehicle. This method is advantageous because of its simplicity and traceability. On the other hand, it is known that the trailer control unit connected to the CAN bus of the towing vehicle measures when the ignition is switched on whether bulbs are connected to the connections of the socket. To do this, a short current pulse is applied to the cable at regular intervals; existing incandescent lamps strongly attenuate the signal due to their characteristic cold resistance. If indicators, reversing lights and rear fog lamp as well as a white reversing light are connected to the socket, the trailer control unit signals trailer operation via the CAN bus. This enables, for example, the configuration of the trailer detection system to be started, but also influences the driving dynamics characteristics or the transmission shift points.

The transmitting of information about the hitch from the computing unit of the vehicle to the computing system of the trailer takes place in particular with regard to the position of the hitch. This means that the vehicle's computing unit provides the information necessary for the next step of the computing system of the trailer to determine configuration data. A transmitted information should in some way allow the computing system to derive the position of the trailer in the condition connected to the vehicle so that the trailer detection system does not perform false detections.

Then, the trailer detection system's configuration data is determined by the computing system of the trailer based on the hitch information. For example, the computing system can derive from a given suspension height how individual sensor units of the trailer detection system are arranged to the underground, particularly in terms of height and angle to the underground. These values can be used, for example, to perform a distance detection by the trailer detection system after a corresponding configuration of the trailer detection system with configuration data and corrected against false detections. The configuration data can, for example, be retrieved from a pre-installed database. This can be done from a memory of the trailer, the vehicle and/or in an external cloud. The basis for selecting the configuration data is then the information previously transmitted by the vehicle's computing unit. As an alternative or redundant alternative to higher reliability, the configuration data can also be calculated using a predefined algorithm. Here, too, the basis for selecting the configuration data is the information previously transmitted by the vehicle's computing unit.

The trailer detection system is then configured by the computing system of the trailer based on the specific configuration data. Although the trailer may not have been connected to the vehicle before the method was started, the trailer detection system of the trailer can now perform a qualified and reliable detection after configuring the trailer detection system. In other words, any unknowns that would prevent reliable detection have been eliminated by the trailer itself.

According to a modified embodiment of the invention, it is provided that the information about the hitch comprises an amount of a height of the hitch above an underground. It has been found that the height of the hitch in particular provides useful and helpful information on which configuration of the trailer detection system is to be carried out and which configuration data should be used. For example, in the case of a stiff trailer, the positions of individual sensor units can be determined quickly and easily using simple mathematics based on the height of the hitch. It is therefore low-data information that offers a high added value.

According to a modified embodiment of the invention, it is provided that the trailer detection system comprises one or more sensor units, wherein at least one sensor unit comprises a sensor computing unit designed as the computing system, which is configured such that the sensor computing unit controls one or more, preferably all, sensor units of the trailer detection system. This can be done as master-slave principle. Traditionally, most previous systems work with a computing unit that controls the sensor units individually and receives and evaluates their signals. The above-mentioned master-slave principle is a cost-effective system, whereby one of the sensor units assumes the task of the computing system, while the other sensor units are controlled by the sensor unit acting as the master sensor unit. This reduces costs and computing capacities.

According to a modified embodiment of the invention, it is provided that the trailer detection system comprises one or more sensor units and the computing system of the trailer comprises a trailer computing unit, wherein the trailer computing unit and the sensor units are configured such that the trailer computing unit controls one or more, preferably all, sensor units of the trailer detection system. This option can be applied in addition to the above-mentioned master-slave principle or completely separately. With an additional option, the redundant design increases reliability in the event of a single component failure. In other words, the vehicle's computing unit is not required to carry out the relevant process steps.

According to a modified embodiment of the invention, it is provided that a vehicle-integrated vehicle detection system is activated by decoupling the trailer from the vehicle. This means that detection is always possible, i.e. via the trailer detection system when the trailer is coupled and via the vehicle detection system when the trailer is uncoupled. The order in which the vehicle-integrated vehicle detection system is not activated until the trailer is decoupled from the vehicle means that no signals are superimposed, so that no false detections occur. Furthermore, the required computing capacity is reduced.

According to a modified embodiment of the invention, it is provided that the trailer detection system comprises one or more sensor units, wherein for determining the configuration data of the trailer detection system, by the computing system of the trailer, at least one of the following is retrieved from a memory of the computing system:

- Type of trailer;
- Number of sensor units mounted;
- Distance between the sensor units;
- Mounting angle of the sensor units; and/or
- Height at which the sensor units are arranged opposite an underground, based on the position of the hitch. It has been found that these are relevant system inputs to enable reliable detection with the trailer. Preferably all these characteristics are known. Optionally, it may be sufficient that only some of these characteristics are known in order to reduce the computing capacity, for example.

According to a modified embodiment of the invention, it is provided that the computing system of the trailer forwards distance information detected by the trailer detection system to the vehicle network via a communication interface. Thus, the detected data or distance information can be used for standard driving maneuvers. The distance information can, for example, be used during a parking maneuver. In other words, using this distance information, the trailer can be treated as a component of the vehicle.

According to a modified embodiment of the invention, it is provided that the computing system comprises a set of pre-defined possible configuration data, based on the height information. This can be advantageous in order to enable detection as quickly and reliably as possible. The system is thus prelearned. The height information can be exact values or intervals of values. In particular, the height information can be physically contained in the computing system or be drawn from an external cloud. In particular, this is a measure that reduces the computing capacity.

According to a modified embodiment of the invention, it is provided that the computing system computes the configuration data, based on the height information. This can be advantageous in order to carry out a detection as precisely as possible, because exact values can be used without the need for data storage for a large number of exact values.

According to a modified embodiment of the invention, it is provided that the computing system configures the trailer detection system before indicating a trailer detection system availability to the vehicle. This ensures that the driver of the vehicle does not perform any early driving maneuvers that could lead to an accident due to the lack of a trailer detection system already configured.

According to a modified embodiment of the invention, it is provided that the trailer is a bicycle trailer, preferably without separate contact with an underground. It has been found that the method is particularly suitable for bicycle trailers, as these are usually close to the vehicle. In particular, it is preferable that the trailer is not in contact with the underground. This means that a driver can expand the vehicle to include the trailer without having to make any lasting changes to the driving behavior. In other words, it is a kind of fusion of two components, resulting in a fused detection system.

According to a modified embodiment of the invention, it is provided that the trailer detection system is an ultrasonic detection system. It has been found that the trailer detection system provides reliable detection if the trailer detection system is designed as an ultrasonic detection system. Individual sensor units are ultrasonic sensor units. It is also possible that the trailer detection system is at least an ultrasonic detection system, but also includes other sensor technologies, such as cameras. So, the ultrasonic sensor device may also include an electronic control unit, which is a computing unit, with which sensor signals provided by the ultrasonic sensors can be evaluated. The electronic control unit is also used to control the ultrasonic sensors to transmit the ultrasonic signal.

The present invention also provides a trailer detection system with means for configuring the trailer detection system for executing the steps of the method.

The present invention also provides a trailer comprising the trailer detection system.

The present invention also provides a computer program comprising instructions which, when the program is executed by a computer, cause the computer to execute the steps of the method. A computer program is a collection of instructions for performing a specific task that is designed to solve a specific class of problems. The instructions of a program are designed to be executed by a computer and it is required that a computer can execute programs in order to it to function.

The present invention also provides a data carrier signal, which the computer program transmits.

The present invention also provides a computer-readable medium comprising instructions which, when executed by a computer, cause the computer to execute the steps of the method.

These and other aspects of the invention will be apparent from and elucidated with reference to the embodiments described hereinafter. Individual features disclosed in the embodiments can constitute alone or in combination an aspect of the present invention. Features of the different embodiments can be carried over from one embodiment to another embodiment.

Figure 1:
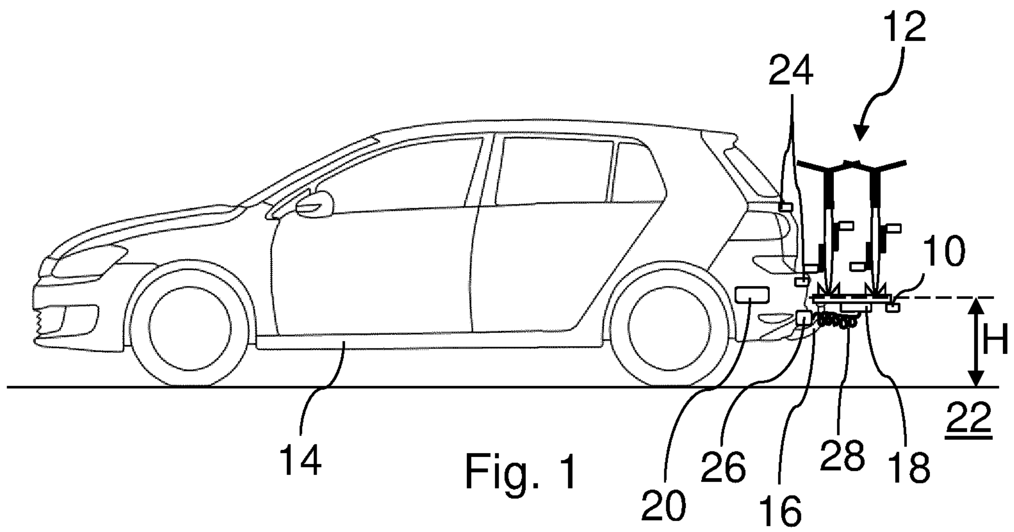
FIG. 1 shows a schematic side view of a vehicle with a trailer having a trailer detection system and a vehicle connected thereto, for carrying out a preferred method, according to the teaching of the invention.
Figure 2:
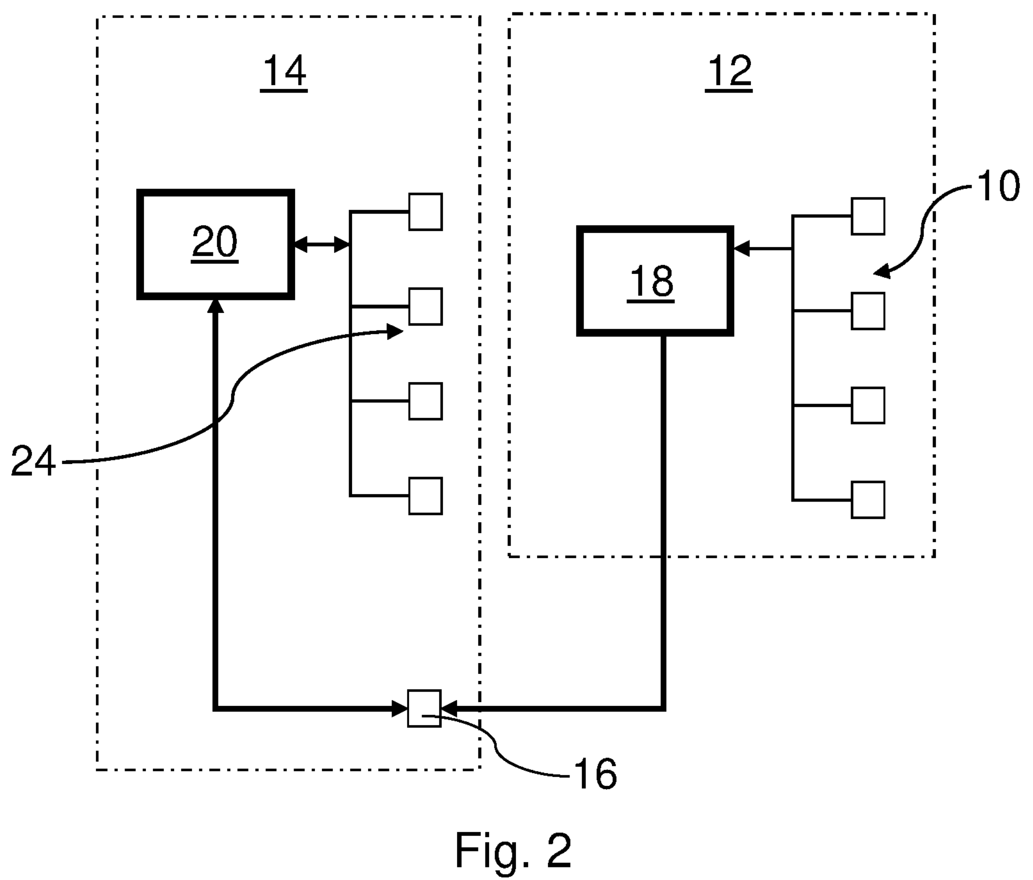
FIG. 2 shows a schematic block diagram of the vehicle and the trailer according to FIG. 1, according to a first embodiment of the invention.
Figure 3:
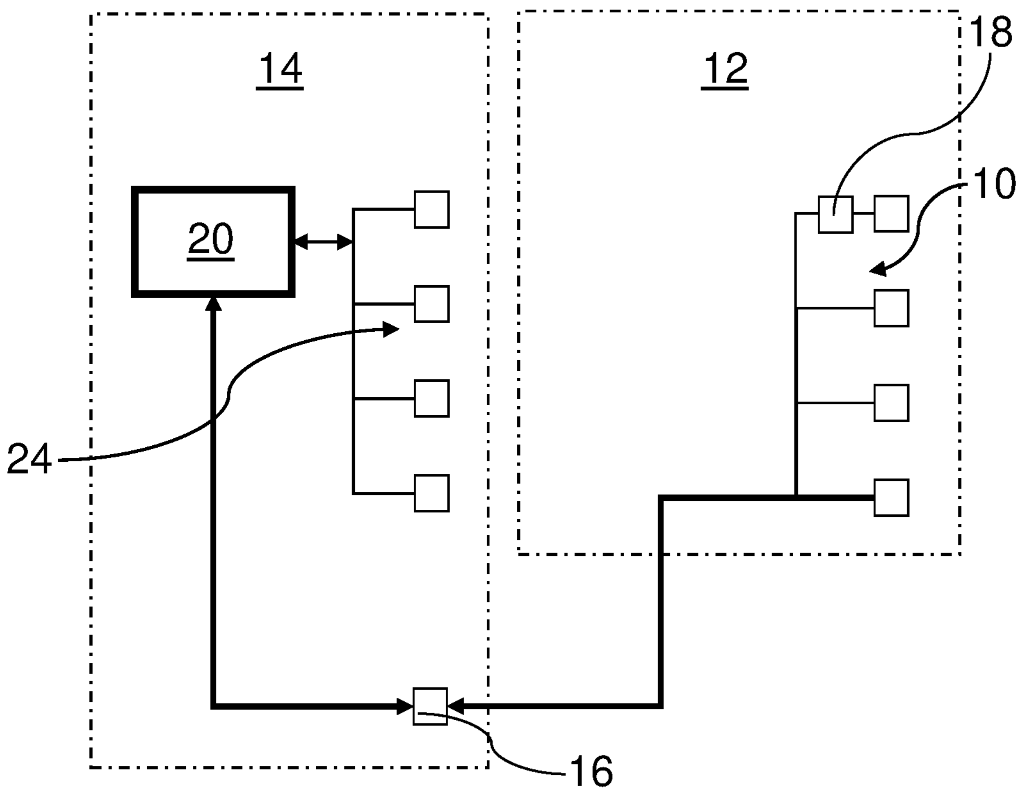
FIG. 3 shows a schematic block diagram of the vehicle and the trailer according to FIG. 1, according to a second embodiment of the invention.

The FIGS. 1, 2 and 3 show the same structure of an exemplary configuration of a vehicle 14 and a trailer 12 connected to it. According to FIG. 1, trailer 12 is exemplarily designed as a bicycle trailer. A hitch 16 with its coupling element along a height H is at a distance from an underground 22 on which the vehicle 14 stands. FIGS. 2 and 3 show block pictures according to a functional structure of the units of the vehicle 14 involved in the method according to the invention and of the units of the trailer 12 involved in the method according to the invention. The trailer 12 can be any trailer 12.

The FIGS. 1, 2 and 3 show an arrangement of a trailer 12 with a trailer detection system 10 connected to a vehicle 14 via a hitch 16. The trailer detection system 10 is configured, whereby this configuration is carried out by a method in accordance with the invention. This method is in particular a method for configuring the trailer detection system 10, wherein, as already mentioned, the trailer 12 is connected to the vehicle 14 via the hitch 16, and wherein the trailer 12 comprises the trailer detection system 10 and a computing system 18. The method comprises at least the following steps, namely a determining, by a vehicle-integrated computing unit 20, that the trailer 12 is connected to the vehicle 14 via the hitch 16 for data transmission; a transmitting of information via the hitch 16, from the computing unit 20 of the vehicle 14 to the computing system 18 of the trailer 12; determining configuration data of the trailer detection system 10 by the computing system 18 of the trailer 12 based on the information about the hitch 16; and configuring the trailer detection system 10 based on the determined configuration data, by the computing system 18 of the trailer 12.

In particular, it is provided that the information about the hitch 16 comprises an amount of a height H of the hitch 16 above an underground 22. This is only illustrated in FIG. 1.

According to FIG. 2, after an exemplary embodiment, it is preferred that the trailer detection system 10 comprises several sensor units and the computing system 18 of the trailer 12 comprises a trailer computing unit separate from the sensor units. The sensor units and the trailer computing unit are designed in such a way that the trailer computing unit controls all the sensor units of the trailer detection system 10.

According to FIG. 3, according to an embodiment alternative to FIG. 2, it is preferred that the trailer detection system 10 comprises several sensor units, one sensor unit comprising a sensor computing unit designed as the computing system 18. The sensor computing unit is designed in such a way that it controls all sensor units of the trailer detection system 10.

Both FIG. 2 and FIG. 3 exemplarily show four sensor units as part of the trailer detection system 10.

According to FIGS. 1, 2 and 3, it is particularly preferred that a vehicle-integrated vehicle detection system 24 is activated as soon as trailer 12 is decoupled from vehicle 14. Because of the procedural character of this ranking order, only the vehicle detection system 24 is shown in the figures, but not the method step itself.

It is preferred that the trailer detection system 10 comprises a plurality of sensor units, wherein for determining the configuration data of the trailer detection system 10, by the computing system 18 of the trailer 12, at least one of the following is retrieved from a memory of the computing system 18: type of trailer 12; number of sensor units mounted; distance between the sensor units; mounting angle of the sensor units; and/or height H at which the sensor units are arranged opposite an underground 22, based on the position of the hitch 16.

In FIG. 1 exemplarily illustrated and in FIGS. 2 and 3 exemplified, it is intended that the computing system 18 of the trailer 12 transmits 10 detected distance information from the trailer detection system 10 via a communication interface to the vehicle network. FIG. 1 shows a curled data cable 28 between the computing system 18 of the trailer 12 and a connection socket 26 of the vehicle 14. The communication between the trailer 12 and the vehicle 14 runs via a respective communication protocol. A wireless connection as a communication interface to the vehicle network is also possible, but not shown.

Preferably, the computing system 18 is intended to comprise a set of predefined possible configuration data based on the height information. Alternatively or additionally, the computing system 18 can compute the configuration data, also based on the height information.

It is preferable for the computer system 18 to configure the trailer detection system 10 before indicating the availability of the trailer detection system 10 to the vehicle 12.

As can be seen in FIG. 1, the trailer 12 is preferably a bicycle trailer. Particularly preferred the trailer 12 has no separate contact to the underground 22. For example, the trailer 12 does not comprise a supporting wheel that stabilizes it against the underground 22.

The trailer detection system 10 is also shown in FIG. 1 and can be assumed to be an ultrasonic detection system according to its arrangement.

REFERENCE SIGNS LIST

10 trailer detection system
12 trailer
14 vehicle
16 hitch
18 computing system
20 computing unit
22 underground
24 vehicle detection system
26 connection socket
28 data cable
H Height of the hitch from the underground

The invention claimed is:

1. A method for configuring a trailer detection system, comprising:

connecting a trailer to a vehicle via a hitch, wherein the trailer comprises the trailer detection system and a computing system;

after connecting the trailer to the vehicle via the hitch:

determining, by a computing unit integrated with the vehicle, using a signal transmitted by a bus of the vehicle, that the trailer is connected to the vehicle via the hitch for data transmission;

transmitting information about the hitch from the computing unit of the vehicle to the computing system of the trailer via the bus of the vehicle;

wherein the information about the hitch comprises height information corresponding to an amount of a height of the hitch above an underground;

determining configuration data of the trailer detection system by the computing system of the trailer, based on the information about the hitch; and changing a processing of ultrasonic signals received by a plurality of ultrasonic sensor units of the trailer detection system based on the determined configuration data, by the computing system of the trailer, wherein changing the processing of the ultrasonic signals comprises adjusting at least one parameter for object detection by the ultrasonic sensors at the trailer, and wherein a vehicle-integrated vehicle detection system is activated by decoupling the trailer from the vehicle.

2. The method according to claim 1, wherein at least one ultrasonic sensor unit of the plurality of ultrasonic sensor units comprises an ultrasonic sensor computing unit designed as the computing system, which is configured such that the ultrasonic sensor computing unit controls one or more of the plurality of ultrasonic sensor units of the trailer detection system.

3. The method according to claim 1, wherein the computing system of the trailer comprises a trailer computing unit configured such that the trailer computing unit controls one or more of the plurality of ultrasonic sensor units of the trailer detection system.

4. The method according to claim 1, wherein determining the configuration data of the trailer detection system, by the computing system of the trailer, further comprises retrieving at least one of the following from a memory of the computing system:

a type of the trailer;

a number of the ultrasonic sensor units mounted;

a distance between the plurality of ultrasonic sensor units;

a mounting angle of the plurality of ultrasonic sensor units; and a height at which the plurality of ultrasonic sensor units are arranged opposite an underground, based on a position of the hitch.

5. The method according to claim 1, wherein the computing system of the trailer forwards distance information detected by the trailer detection system to a vehicle network via a communication interface.

6. The method according to claim 1, wherein the computing system comprises a set of pre-defined possible configuration data, based on the height information.

7. The method according to claim 1, wherein the computing system computes the configuration data, based on the height information.

8. The method according to at least claim 1, wherein the computing system configures the trailer detection system before indicating a trailer detection system availability to the vehicle.

9. The method according to claim 1, wherein the trailer is a bicycle trailer without separate contact with an underground.

10. A trailer detection system comprising means for configuring the trailer detection system according to claim 1.

11. The trailer comprising a trailer detection system according to claim 10.

12. A non-transient computer-readable medium comprising computer-readable instructions stored thereon which, when executed by a computer, cause the computer to execute the steps of the method according to claim 1.

13. A method for configuring a trailer detection system, comprising:

connecting a trailer to a vehicle via a hitch, wherein the trailer comprises the trailer detection system and a computing system;

after connecting the trailer to the vehicle via the hitch:

determining, by a computing unit integrated with the vehicle, using a signal transmitted by a bus of the vehicle, that the trailer is connected to the vehicle via the hitch for data transmission;

transmitting information about the hitch from the computing unit of the vehicle to the computing system of the trailer via the bus of the vehicle;

wherein the information about the hitch comprises height information corresponding to an amount of a height of the hitch above an underground;

determining configuration data of the trailer detection system by the computing system of the trailer, based on the information about the hitch; and changing a processing of ultrasonic signals received by a plurality of ultrasonic sensor units of the trailer detection system based on the determined configuration data, by the computing system of the trailer;

wherein a vehicle-integrated vehicle detection system is activated by decoupling the trailer from the vehicle.

14. The method according to claim 13, wherein the trailer detection system cooperates with the vehicle-integrated vehicle detection system while the trailer is connected to the vehicle, before decoupling the trailer from the vehicle, resulting in a fused detection system.

15. A method for configuring a trailer detection system, comprising:

connecting a trailer to a vehicle via a hitch, wherein the trailer comprises the trailer detection system and a computing system;

after connecting the trailer to the vehicle via the hitch:

determining, by a computing unit integrated with the vehicle, using a signal transmitted by a bus of the vehicle, that the trailer is connected to the vehicle via the hitch for data transmission;

transmitting information about the hitch from the computing unit of the vehicle to the computing system of the trailer via the bus of the vehicle;

wherein the information about the hitch comprises height information corresponding to an amount of a height of the hitch above an underground;

determining configuration data of the trailer detection system by the computing system of the trailer, based on the information about the hitch; and changing a processing of ultrasonic signals received by a plurality of ultrasonic sensor units of the trailer detection system based on the determined configuration data, by the computing system of the trailer;

wherein the computing system computes the configuration data based on the height information.

* * * * *